United States Patent Office 2,834,677
Patented May 13, 1958

2,834,677

METHOD OF MAKING A FROZEN SANDWICH

William Geisler, Tenafly, N. J., assignor, by mesne assignments, to C & C Super Corporation, New York, N. Y., a corporation of Delaware No Drawing. Application October 5, 1951
Serial No. 250,019

3 Claims. (Cl. 99—1)

This invention relates to sandwiches and method of making the same, and has for its object to provide a sandwich which may be stored as a frozen food item and yet be indistinguishable from a freshly made sandwich when heated to normal temperatures.

It has heretofore been proposed to manufacture sandwiches in large quantities, freeze them and maintain them in frozen condition for a substantial period of time. When such sandwiches are heated to normal temperatures they are indistinguishable from freshly made sandwiches if the filling is dry and solid and contains nothing which is absorbed by the bread. Such sandwiches, however, if the filling contains ingredients having a substantial moisture content, are readily distinguishable from sandwiches which are freshly made for the reason that the moisture in the filling soaks into the bread before the sandwich becomes frozen and makes it soggy when the temperature of the frozen sandwich is sufficiently elevated for the sandwich to be eaten. By my improved procedure sandwiches of this character may be made and stored for a period of weeks or months, and when finally distributed cannot be distinguished from freshly made sandwiches.

In carrying out my invention I obtain fresh sliced bread and freeze it while still fresh by any of the usual quick-freeze processes. Bread so frozen is not subject to change when stored at the usual subfreezing temperatures. When the temperature of the frozen bread is raised to a point where it may be eaten the bread cannot be distinguished from fresh bread.

The filling for the sandwiches should be chilled but need not be frozen. The sandwich is made with the frozen bread and the chilled filling immediately upon the removal of the frozen bread from storage. The sandwich is promptly wrapped in waxed paper or other suitable wrapping and is then subjected to a quick-freeze operation which freezes the filling and extracts from the bread such heat as may have been absorbed by the bread in the making of the sandwich. By this process the liquid content of the filling is not absorbed by the frozen bread.

The bread, when removed from the subfreezing storage absorbs heat very slowly and in the brief interval required to spread the sandwich and wrap it the bread remains hard-frozen and non-absorbent, and if the sandwich is quickly subjected to a quick-freeze operation the filling will be frozen before the condition of the bread is in any way altered. When the sandwich is removed from storage the filling will remain solid about as long as the bread remains non-absorbent so that when the bread and filling have reached a proper temperature for consumption the total period of time during which the filling contains liquid and the bread is absorbent is comparatively short and not long enough for the bread to get soggy from the absorbed liquid, as is the case when sandwiches are made in bulk and shipped or stored for a matter of several hours before consumption. If desired, the filling may also be frozen before it is assembled with the frozen bread. In the mass production of the sandwiches the filling may be preformed into small slabs of the desired shape and thickness and placed alongside the bread in the conveyor of a freezing tunnel so that the filling and the bread are simultaneously frozen but out of contact. When the conveyor emerges from the tunnel the bread and filling are assembled, wrapped and placed in sub-freezing storage.

My invention is particularly useful in the preparation of sandwiches for sale on trains and at lunch counters and the like where it is not feasible to make the sandwiches as required for consumption. The sandwiches may be removed from the frozen food storage unit in small quantities at successive intervals as determined by the demand, so that the period that the sandwich remains at room temperature before consumption is comparatively brief.

In the foregoing specification I have described several ways of utilizing my invention in the making of sandwiches, the essential feature being the freezing of the bread before it is assembled with the sandwich filling and maintaining the bread in a frozen condition until immediately prior to the time that the sandwich is to be eaten. It is to be understood, however, that my invention is not limited to the procedure described and that it may be variously modified without departing from the spirit of the invention. For example, the sandwich filling may be mixed and frozen in bulk and cut while frozen into slices of the desired size and content for the sandwich.

I claim:

1. The method of making sandwiches which consists in providing slices of frozen bread, chilling the filling for the sandwich to an extent such that it is not absorbed by the frozen bread, assembling the sandwich filling with the bread while the bread is frozen and placing the sandwich in sub-freezing storage while the bread is still frozen.

2. The method of making sandwiches which consists in providing slices of frozen bread, assembling the sandwich filling with the bread while the bread is frozen, solidifying the filling by freezing and placing the sandwich in sub-freezing storage while the bread is still frozen.

3. The method of making sandwiches which consists in providing slices of frozen bread, shaping and freezing the desired filling, assembling the bread and filling while frozen and placing the sandwich in sub-freezing storage.

References Cited in the file of this patent
UNITED STATES PATENTS

| | | |
|---|---|---|
| 1,759,682 | Birdseye | May 20, 1930 |
| 1,786,387 | Battista | Dec. 23, 1930 |
| 1,968,183 | Vogt | July 31, 1934 |
| 2,248,289 | Thal | July 8, 1941 |
| 2,522,221 | Gorton | Sept. 12, 1950 |

OTHER REFERENCES

"Industrial and Engineering Chemistry," March 1939, pages 362 to 368, inclusive, article entitled Freezing as a Means of Retarding Bread Staling.

"Quick Frozen Foods," May 1948, page 69.
"Quick Frozen Foods," December 1948, page 63.